United States Patent
Gardner et al.

(10) Patent No.: US 8,634,273 B2
(45) Date of Patent: Jan. 21, 2014

(54) ACOUSTIC TELEMETRY SYSTEM USING PASSBAND EQUALIZATION

(75) Inventors: Wallace R. Gardner, Houston, TX (US); Vimal V. Shah, Sugarland, TX (US); Carl A. Robbins, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 12/605,979

(22) Filed: Oct. 26, 2009

(65) Prior Publication Data
US 2010/0039898 A1    Feb. 18, 2010

Related U.S. Application Data

(63) Continuation of application No. 10/998,974, filed on Nov. 29, 2004, now abandoned.

(51) Int. Cl.
   E21B 47/16    (2006.01)
(52) U.S. Cl.
   USPC .............................................. 367/82; 367/81
(58) Field of Classification Search
   USPC ................ 367/13, 81, 82, 83, 85; 340/854.4, 340/855.4, 855.6; 175/40; 181/103
   See application file for complete search history.

(56) References Cited

U.S. PATENT DOCUMENTS

| | | | |
|---|---|---|---|
| 4,293,936 A | 10/1981 | Cox et al. | |
| 4,390,975 A * | 6/1983 | Shawhan | 367/82 |
| 5,050,132 A | 9/1991 | Duckworth | |
| 5,128,901 A | 7/1992 | Drumheller | |
| 5,148,408 A | 9/1992 | Matthews | |
| 5,274,606 A | 12/1993 | Drumheller et al. | |
| 5,490,121 A | 2/1996 | Gardner et al. | |
| 6,108,268 A | 8/2000 | Moss | |
| 6,310,829 B1 | 10/2001 | Green et al. | |
| 6,320,820 B1 | 11/2001 | Gardner et al. | |
| 6,434,084 B1 | 8/2002 | Schultz | |
| 6,583,729 B1 | 6/2003 | Gardner et al. | |
| 6,847,585 B2 | 1/2005 | Macpherson | |
| 2002/0180613 A1 * | 12/2002 | Shi et al. | 340/853.1 |
| 2003/0010493 A1 | 1/2003 | Hill et al. | |
| 2003/0072217 A1 | 4/2003 | Macpherson | |
| 2003/0142586 A1 * | 7/2003 | Shah et al. | 367/82 |
| 2006/0114746 A1 | 6/2006 | Gardner et al. | |

FOREIGN PATENT DOCUMENTS

WO    WO-2006065483 A1    3/2006
WO    WO-2006065483 C2    12/2006

OTHER PUBLICATIONS

Principia Cybernetica Web definition of "channel", downloaded Dec. 1, 2011 as http://pespmc1.vub.ac.be/ASC/CHANNEL.html.*
Passband—From Wikipedia, the free encyclopedia, downloaded from http://en.wikipedia.org/wiki/Passband Dec. 27, 2012.*

(Continued)

*Primary Examiner* — Isam Alsomiri
*Assistant Examiner* — Daniel L Murphy
(74) *Attorney, Agent, or Firm* — Schwegman, Lundberg & Woessner, P.A.; Scott Wendorf

(57) ABSTRACT

An embodiment includes a method comprising transmitting and receiving an acoustic signal that is modulated along a jointed tubing. The acoustic signal may be transmitted in multiple passbands of the jointed tubing and may be modulated differently in different passbands. A swept frequency signal may be used to determine transmission characteristics of the jointed tubing and to select the multiple passbands. Additional embodiments are disclosed.

18 Claims, 6 Drawing Sheets

(56) References Cited

OTHER PUBLICATIONS

Impulse response—From Wikipedia, the free encyclopedia, downloaded from http://en.wikipedia.org/wiki/Impulse_response12/27/2012.*

International Search Report—PCT/US2005/042519, Authorized Officer—Sibylle Schubert-Puschel, (Nov. 22, 2005), 13.

"U.S. Appl. No. 10/998,974, Response filed Sep. 12, 2006 to Non Final Office Action mailed Jun. 13, 2006", 11 pgs.

"U.S. Appl. No. 10/998,974, Advisory Action mailed Mar. 21, 2007", 3 pgs.

"U.S. Appl. No. 10/998,974, Final Office Action mailed Apr. 24, 2008", 19 pgs.

"U.S. Appl. No. 10/998,974, Final Office Action mailed Nov. 27, 2006", 14 pgs.

"U.S. Appl. No. 10/998,974, Non Final Office Action mailed Jun. 13, 2006", 10 pgs.

"U.S. Appl. No. 10/998,974, Response filed Jan. 14, 2008 to Non Final Office Action mailed Jul. 13, 2007", 11 pgs.

"U.S. Appl. No. 10/998,974, Response filed Feb. 27, 2007 to Final Office Action mailed Nov. 27, 2007", 14 pgs.

"U.S. Appl. No. 10/998,974, Response filed Mar. 29, 2006 to Restriction Requirment mailed Mar. 3, 2006", 6 pgs.

"U.S. Appl. No. 10/998,974, Response filed Apr. 26, 2007 to Advisory Action mailed Mar. 21, 2007", 1 pgs.

"U.S. Appl. No. 10/998,974, Restriction Requirement mailed Mar. 3, 2006", 6 pgs.

"Non-Final Office Action mailed Jul. 13, 2007in U.S. Appl. No. 10/998,974", OARN, 18.

Barnes, T. G, et al., "Passbands for Acoustic Transmission in an Idealized Drill String", *The Journal of the Acoustical Society of America*, 51(5), Part 2, (1972), 1606.

Drumheller, D. S, "Acoustical Properties of Drill Strings", *Journal Acoustical Society of America*, 85(3), (Mar. 1989), 1048.

Drumheller, D. S, "Wave Impedances of Drill Strings and other Periodic Media", *Journal of the Acoustical Society of America*, 112(6), (Dec. 2002), 2527.

* cited by examiner

ACOUSTIC TELEMETRY SYSTEM USING PASSBAND EQUALIZATION

RELATED APPLICATION

This application is a continuation of U.S. patent application Ser. No. 10/998,974, filed Nov. 29, 2004, which is incorporated herein by reference.

TECHNICAL FIELD

The application relates generally to communications. In particular, the application relates to an acoustic telemetry system.

BACKGROUND

During drilling operations for extraction of hydrocarbons, a variety of communication and transmission techniques have been attempted to provide real time data from the vicinity of the bit to the surface during drilling. The use of measurements while drilling (MWD) with real time data transmission provides substantial benefits during a drilling operation. For example, monitoring of downhole conditions allows for an immediate response to potential well control problems and improves mud programs.

Measurement of parameters such as weight on bit, torque, wear and bearing condition in real time provides for more efficient drilling operations. In fact, faster penetration rates, better trip planning, reduced equipment failures, fewer delays for directional surveys, and the elimination of a need to interrupt drilling for abnormal pressure detection is achievable using MWD techniques.

Currently, there are four major categories of telemetry systems that have been used in an attempt to provide real time data from the vicinity of the drill bit to the surface; namely, acoustic waves, mud pressure pulses, insulated conductors and electromagnetic waves.

With regard to acoustic waves, typically, an acoustic signal is generated near the bit and is transmitted through the drill pipe, mud column or the earth. It has been found, however, that the very low intensity of the signal which can be generated downhole, along with the acoustic noise generated by the drilling system, makes signal detection difficult. Reflective and refractive interference resulting from changing diameters and thread makeup at the tool joints compounds the signal attenuation problem for drill pipe transmission. Such reflective and refractive interference causes interbit interference among the bits of data being transmitted.

In a mud pressure pulse system, the resistance of mud flow through a drill string is modulated by means of a valve and control mechanism mounted in a special drill collar near the bit. This type of system typically transmits at one bit per second as the pressure pulse travels up the mud column at or near the velocity of sound in the mud. It is well known that mud pulse systems are intrinsically limited to a few bits per second due to attenuation and spreading of pulses.

Insulated conductors or hard wire connection from the drill bit to the surface is an alternative method for establishing downhole communications. This type of system is capable of a high data rate and two-way communication is possible. It has been found, however, that this type of system requires a special drill pipe and special tool joint connectors that substantially increase the cost of a drilling operation. Also, these systems are prone to failure as a result of the abrasive conditions of the mud system and the wear caused by the rotation of the drill string.

The fourth technique used to telemeter downhole data to the surface uses the transmission of electromagnetic waves through the earth. A current carrying downhole data signal is input to a toroid or collar positioned adjacent to the drill bit or input directly to the drill string. When a toroid is utilized, a primary winding, carrying the data for transmission, is wrapped around the toroid and a secondary is formed by the drill pipe. A receiver is connected to the ground at the surface where the electromagnetic data is picked up and recorded. It has been found, however, that in deep or noisy well applications, conventional electromagnetic systems are unable to generate a signal with sufficient intensity to be recovered at the surface.

In general, the quality of an electromagnetic signal reaching the surface is measured in terms of signal to noise ratio. As the ratio drops, it becomes more difficult to recover or reconstruct the signal. While increasing the power of the transmitted signal is an obvious way of increasing the signal to noise ratio, this approach is limited by batteries suitable for the purpose and the desire to extend the time between battery replacements. These approaches have allowed development of commercial borehole electromagnetic telemetry systems that work at data rates of up to four bits per second and at depths of up to 4000 feet without repeaters in MWD applications. It would be desirable to transmit signals from deeper wells and with much higher data rates which will be required for logging while drilling, LWD, systems.

BRIEF DESCRIPTION OF THE DRAWING

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Methods, apparatus and systems for an acoustic telemetry system using passband equalization are described. In the following description, numerous specific details are set forth. However, it is understood that embodiments of the invention may be practiced without these specific details. In other instances, well-known circuits, structures and techniques have not been shown in detail in order not to obscure the understanding of this description.

While described with reference to communications during downhole drilling operations, embodiments may be used any other types of environments for acoustic communications having passbands within the channel used for communications. Additionally, while described with reference to transmitting downhole data to the surface during measurements while drilling (MWD), embodiments of the invention are not so limited. For example, some embodiments are applicable to transmission of data from the surface to equipment that is downhole. Additionally, some embodiments of the invention are applicable not only during drilling, but throughout the life of a wellbore including, but not limited to, during logging, drill stem testing, completing and production. Further, some embodiments of the invention can be used in other noisy conditions, such as hydraulic fracturing and cementing.

As further described below, some embodiments include the modulation of an acoustic signal along a jointed tubing within passbands that are formed because of the joints and other characteristics of the jointed tubing. Some embodiments allow for passband equalization using any of a number of different types of modulations (such as Quadrature Amplitude Modulation (QAM), Frequency Shift Key (FSK) modulation, Phase Shift Key (PSK) modulation, a multi-pulse block correlation modulation, etc.). Each of the different passbands may effectively constitute a segregated transmission channel. Additionally, the equalization of a given passband may be independent of the equalization of other passbands in the acoustic signal. Therefore, the different parameters for equalization (such as the different weights, number of taps, etc.) may be different for each of the different passbands. Because the passbands are equalized, some embodiments may include higher bandwidth modulation (such as Quadrature Amplitude Modulation (QAM)).

Furthermore, one or more modulations may be performed for each passband. The selection of the types of modulations may be dependent on the channel effects (including noise and attenuation). For example, for a region of the frequency spectrum of the acoustic signal wherein noise and attenuation are high, an FSK modulation or a low order Multiple PSK modulation (such as a Quadrature PSK (QPSK) modulation) may be used. For a region of the frequency spectrum wherein noise and attenuation may be relatively low, QAM may be used.

Figure 1:
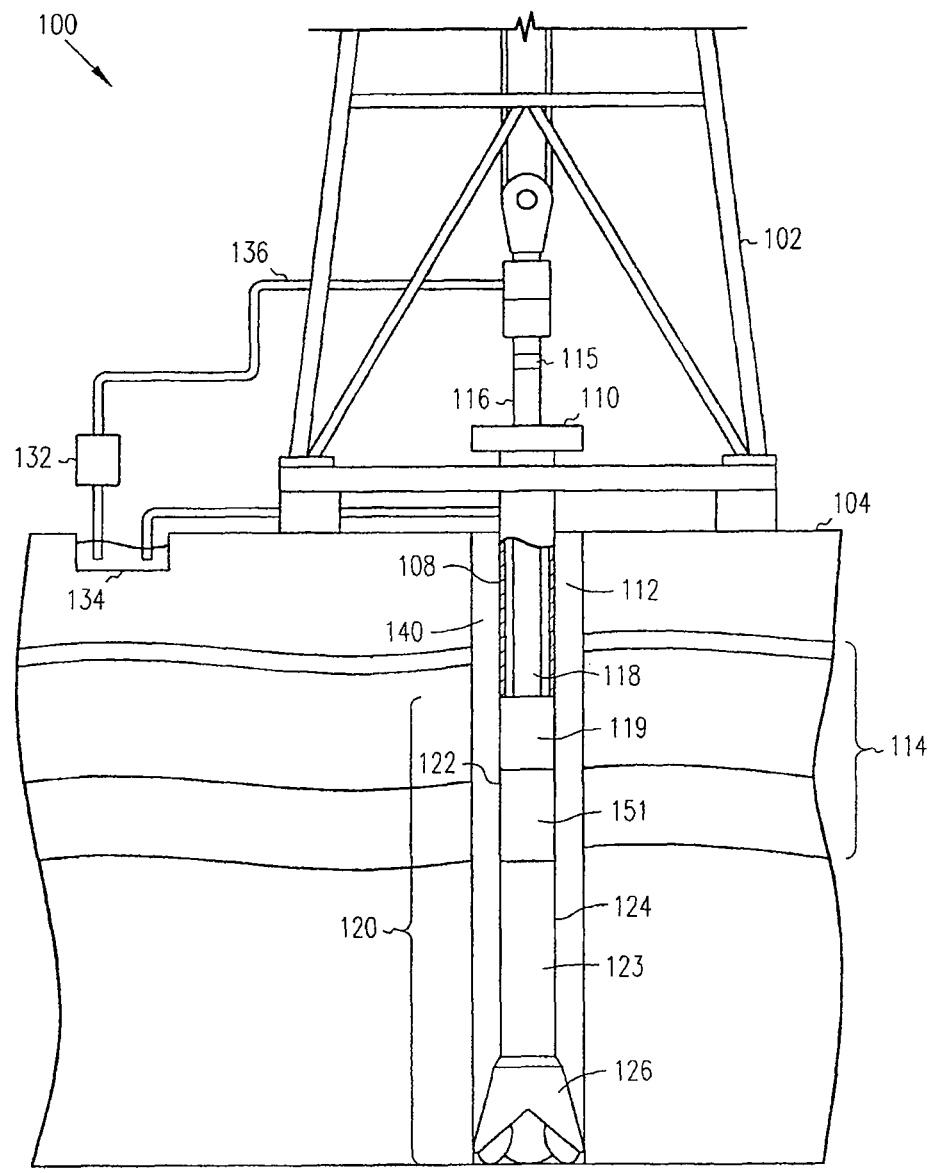
FIG. 1 illustrates a system for drilling operations, according to some embodiment of the invention.

FIG. 1 illustrates a system for drilling operations, according to some embodiments of the invention. A system 100 includes a drilling rig 102 located at a surface 104 of a well. The drilling rig 102 provides support for a drill string 108. The drill string 108 penetrates a rotary table 110 for drilling a borehole 112 through subsurface formations 114. The drill string 108 includes a Kelly 116 (in the upper portion), a drill pipe 118 and a bottom hole assembly 120 (located at the lower portion of the drill pipe 118). The bottom hole assembly 120 may include a drill collar 122, a downhole tool 124 and a drill bit 126. The downhole tool 124 may be any of a number of different types of tools including Measurement While Drilling (MWD) tools, Logging While Drilling (LWD) tools, a topdrive, etc.

During drilling operations, the drill string 108 (including the Kelly 116, the drill pipe 118 and the bottom hole assembly 120) may be rotated by the rotary table 110. In addition or alternative to such rotation, the bottom hole assembly 120 may also be rotated by a motor (not shown) that is downhole. The drill collar 122 may be used to add weight to the drill bit 126. The drill collar 122 also may stiffen the bottom hole assembly 120 to allow the bottom hole assembly 120 to transfer the weight to the drill bit 126. Accordingly, this weight provided by the drill collar 122 also assists the drill bit 126 in the penetration of the surface 104 and the subsurface formations 114.

During drilling operations, a mud pump 132 may pump drilling fluid (known as "drilling mud") from a mud pit 134 through a hose 136 into the drill pipe 118 down to the drill bit 126. The drilling fluid can flow out from the drill bit 126 and return back to the surface through an annular area 140 between the drill pipe 118 and the sides of the borehole 112. The drilling fluid may then be returned to the mud pit 134, where such fluid is filtered. Accordingly, the drilling fluid can cool the drill bit 126 as well as provide for lubrication of the drill bit 126 during the drilling operation. Additionally, the drilling fluid removes the cuttings of the subsurface formations 114 created by the drill bit 126.

The drill string 108 may include one to a number of different sensors 151, which monitor different downhole parameters. Such parameters may include the downhole temperature and pressure, the various characteristics of the subsurface formations (such as resistivity, density, porosity, etc.), the characteristics of the borehole (e.g., size, shape, etc.), etc. The drill string 108 may also include an acoustic transmitter 123 that transmits telemetry signals in the form of acoustic vibrations in the tubing wall of the drill string 108. An acoustic receiver 115 is coupled to the Kelly 116 to receive transmitted telemetry signals. One or more repeaters 119 may be provided along the drill string 108 to receive and retransmit the telemetry signals. The repeaters 119 may include both an acoustic telemetry receiver and an acoustic telemetry transmitter configured similarly to the acoustic receiver 115 and the acoustic transmitter 123.

Figure 2:
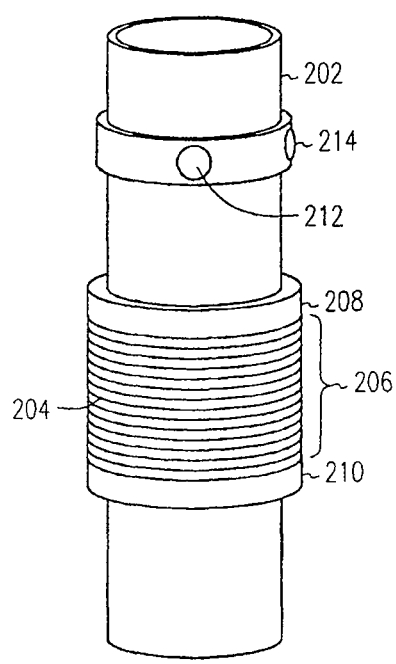
FIG. 2 illustrates a repeater along a drill string, according to some embodiments of the invention.

FIG. 2 illustrates a repeater along a drill string, according to some embodiments of the invention. In particular, FIG. 2 illustrates one embodiment of the repeaters 119. As shown, the repeaters 119 may include an acoustic telemetry transmitter 204 and an acoustic sensor 212 mounted on a piece of tubing 202. One skilled in the art will understand that acoustic sensor 212 is configured to receive signals from a distant acoustic transmitter, and that the acoustic telemetry transmitter 204 is configured to transmit to a distant acoustic sensor. Consequently, although the acoustic telemetry transmitter 204 and the acoustic sensor 212 are shown in close proximity, they would only be so proximate in a repeater 119 or in a bi-directional communications system. Thus, for example, the acoustic transmitter 123 might only include the acoustic telemetry transmitter 204, while the acoustic receiver 115 might only include sensor 212, if so desired.

The following discussion centers on acoustic signaling from acoustic transmitter 123 near the drill bit 126 to a sensor located some distance away along the drill string. Various acoustic transmitters are known in the art, as evidenced by U.S. Pat. Nos. 2,810,546, 3,588,804, 3,790,930, 3,813,656, 4,282,588, 4,283,779, 4,302,826, 4,314,365 and 6,137,747, which are hereby incorporated by reference. The transmitter 204 shown in FIG. 2 has a stack of piezoelectric washers 206 sandwiched between two metal flanges 208, 210. When the stack of piezoelectric washers 206 is driven electrically, the stack 206 expands and contracts to produce axial compression waves in tubing 202 that propagate axially along the drill string. Other transmitter configurations may be used to produce torsional waves, radial compression waves, or even transverse waves that propagate along the drill string. Any suitable transmitter (such as magneto-restrictive) may be used.

Various acoustic sensors are known in the art including pressure, velocity, and acceleration sensors. The sensor 212 preferably comprises a two-axis accelerometer that senses accelerations along the axial and circumferential directions. One skilled in the art will readily recognize that other sensor configurations are also possible. For example, the sensor 212 may comprise a three-axis accelerometer that also detects acceleration in the radial direction. A second sensor 214 may be provided 90 or 180 degrees away from the first sensor 212. This second sensor 214 also preferably comprises a two or three axis accelerometer. Additional sensors may also be employed as needed.

Figure 3:
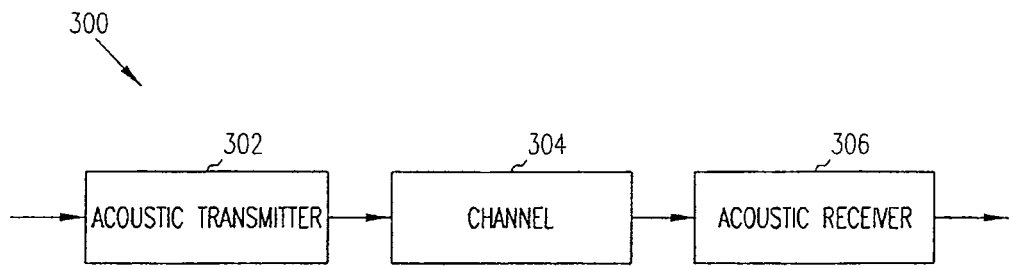
FIG. 3 illustrates a block diagram of an acoustic telemetry system using passband equalization, according to some embodiments of the invention.

FIG. 3 illustrates a block diagram of an acoustic telemetry system using passband equalization, according to some embodiments of the invention. In particular, a system 300 includes an acoustic transmitter 302, a channel 304 and an acoustic receiver 306. The transmitter 302 is coupled to receive data communications. The acoustic transmitter 302 and the acoustic receiver 306 are coupled together through the channel 304. The acoustic transmitter 302 may modulate an acoustic signal along the channel 304. The acoustic receiver 306 may receive this acoustic signal. With reference to the system 100 of FIG. 1, the acoustic transmitter 302 and the acoustic receiver 306 may be the acoustic transmitter 123 and the acoustic receiver 115, respectively. The channel 304 may be the drill string 108. The channel 304 may also include wired drill pipe, production tubing, coiled tubing, drill collars, downhole tools, etc.

In some embodiments, the channel 304 includes a number of different characteristics that may affect the acoustic signal. Such characteristics may include one to a number of joints, length, diameter, etc. In particular, the channel 304 may include a number of pipes that are mated together at a number of joints. Such joints may occur periodically (e.g., every 30 feet). These joints may cause cancellations and enhancement of the acoustic signal modulated thereon. Accordingly, the number of joints in the channel 304 may cause a number of passbands and a number of stopbands within the acoustic signal that is modulated thereon. As further described below, the acoustic transmitter 302 may modulate the acoustic signal within one or more passbands of the acoustic signal. The acoustic receiver 306 may equalize over each of the passbands. In some embodiments, the system 300 is linear, thereby allowing for linear equalization of the passbands.

Figure 4:
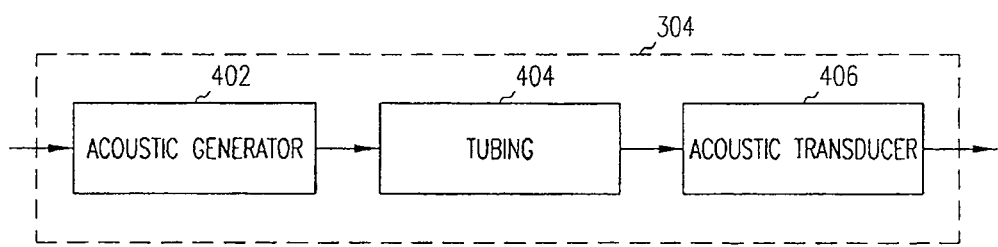
FIG. 4 illustrates a block diagram of an acoustic channel within an acoustic telemetry system and having one or more passbands, according to some embodiments of the invention.

FIG. 4 illustrates a block diagram of an acoustic channel within an acoustic telemetry system and having one or more passbands, according to some embodiments of the invention. In particular, FIG. 4 illustrates an embodiment of the channel 304. The channel 304 includes an acoustic generator 402, a tubing 404 and an acoustic transducer 406. The acoustic generator 402 may convert telemetry-carrying electrical signals into an acoustic signal (acoustic waves) that travel along the tubing 404. In some embodiments, the acoustic generator 402 is a piezoelectric transducer. However, embodiments of the invention are not so limited, as the acoustic generator 402 may be any other type of device that generates the acoustic signal. The acoustic transducer 406 may receive the acoustic signal and convert into an electrical signal.

Figure 5:
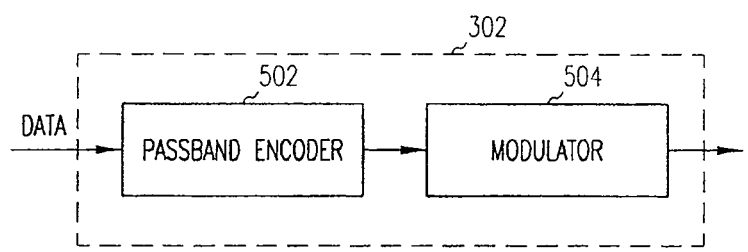
FIG. 5 illustrates a block diagram of an acoustic transmitter within an acoustic telemetry system to modulate an acoustic signal within one or more passbands, according to some embodiments of the invention.

FIG. 5 illustrates a block diagram of an acoustic transmitter within an acoustic telemetry system to modulate an acoustic signal within one or more passbands, according to some embodiments of the invention. In particular, FIG. 5 illustrates an embodiment of the acoustic transmitter 302. The acoustic transmitter 302 includes a passband encoder 502 and a modulator 504. The passband encoder 502 may receive and encode telemetry data. Such data may be from the number of different sensors 151. In some embodiments, the passband encoder 502 may encode the telemetry data. The modulator 504 may modulate the encoded telemetry data onto the channel 304 into the different passbands. Such passbands may be caused by the physical characteristics of the channel 304 (such as joints thereon). The output from the modulator 504 may drive the acoustic generator 402 that may output the acoustic signal onto the channel 304.

Figure 6:
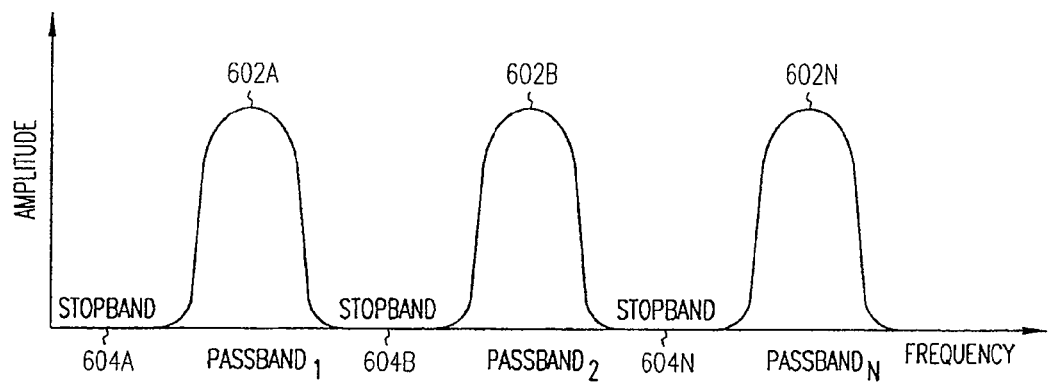
FIG. 6 illustrates an acoustic signal, in the frequency domain, modulated along a channel within an acoustic telemetry system, which includes a number of passbands, according to some embodiments of the invention.

To help illustrate, FIG. 6 shows an acoustic signal, in the frequency domain, modulated along a channel within an acoustic telemetry system, which includes a number of passbands, according to some embodiments of the invention. In particular, FIG. 6 illustrates a graph of the acoustic signal that may modulate along the channel 304. As shown, the acoustic signal includes a number of passbands 602A-602N and a number of stopbands 604A-604N. The passbands 602 and the stopbands 604 include those frequencies that are passed and blocked, respectively, along the channel. While FIG. 6 illustrates non-overlapping passbands 602A-602N, in some embodiments, one or more of the passbands 602 may overlap with another of the passbands 602. In some embodiments, the modulator 504 may modulate the encoded telemetry data such that data is modulated in the non-overlapping passbands.

In some embodiments, the modulator 504 may modulate the encoded telemetry data using a number of different types of modulations in different combinations. The different types of modulations may include QAM, a multi-pulse block correlation modulation, a FSK modulation, a PSK modulation, etc. In some embodiments, the modulator 504 may modulate the encoded telemetry data using one or more modulations within a given passband. For example, a QAM and a PSK modulation may be used for transmitting telemetry data in the passband 602A; a PSK modulation may be used for transmitting telemetry data in the passband 602B; and a FSK modulation and a PSK modulation may be used for transmitting telemetry data in the passband 602N.

Figure 7:
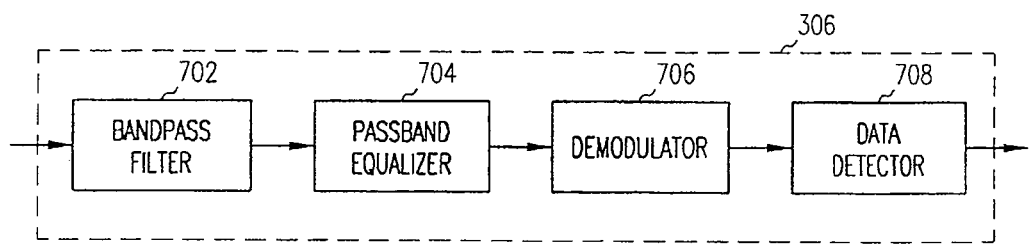
FIG. 7 illustrates a block diagram of an acoustic receiver within an acoustic telemetry system that uses passband equalization, according to some embodiments of the invention.

FIG. 7 illustrates a block diagram of an acoustic receiver within an acoustic telemetry system that uses passband equalization, according to some embodiments of the invention. In particular, FIG. 7 illustrates an embodiment of the acoustic receiver 306. The acoustic receiver 306 includes a bandpass filter 702, a passband equalizer 704, a demodulator 706 and a data detector 708.

The bandpass filter 702 may receive the acoustic signal from the acoustic transducer 406 (shown in FIG. 4). The bandpass filter 702 may be configured to filter out those frequencies not in the one or more passbands (that may be caused by the joints in the channel 304). The output of the bandpass filter 702 is coupled to the input of the passband equalizer 704. The passband equalizer 704 may equalize one or all of the passbands that include telemetry data therein. In some embodiments, the passband equalizer 704 may equalize a given passband independent of equalization of the other passbands. Such equalization may remove the signal distortion caused by the reflections and attenuation in the channel 304. In some embodiments, the passband equalizer 704 may perform a linear equalization. The passband equalizer 704 may perform amplitude and/or phase equalization.

Many suitable equalizers that may be used in the passband equalizer 704 are known and contemplated, such as a linear equalizer (such as an adaptive Finite Impulse Response (FIR) filter), a fractionally-spaced equalizer, a decision feedback equalizer, a maximum likelihood sequence estimator, etc. These are described in detail in Chapter 6 (pp. 519-692) of John G. Proakis, Second Edition *Digital Communications*, McGraw-Hill Book Company, New York, 1989, which is hereby incorporated herein by reference. In some embodiments, the passband equalizer 704 may be implemented in adaptive form to enhance performance over a range of variable channel conditions. If the characteristics of the channel 304 are changed, the parameters of the equalizers for the passbands may be adapted by inputting an error signal that is the difference between the detected data and the samples of undetected data. Filter adaptation is well known and is described in various standard texts such as Hoing & Messerschmitt, *Adaptive Filters: Structures, Algorithms and Applications*, Kluwer, 1990 and Haykin, *Adaptive Filters*, Prentice-Hall, Englewood Cliffs, 1991, which are both hereby incorporated herein by reference.

The demodulator 706 may receive the equalized acoustic signal. The demodulator 706 may demodulate the signal. The data detector 708 may detect the telemetry data in the demodulated signal. In some embodiments, the data detector 708 may include a decoder that performs the reverse of the encode operation performed by the passband encoder 502.

Figure 8:
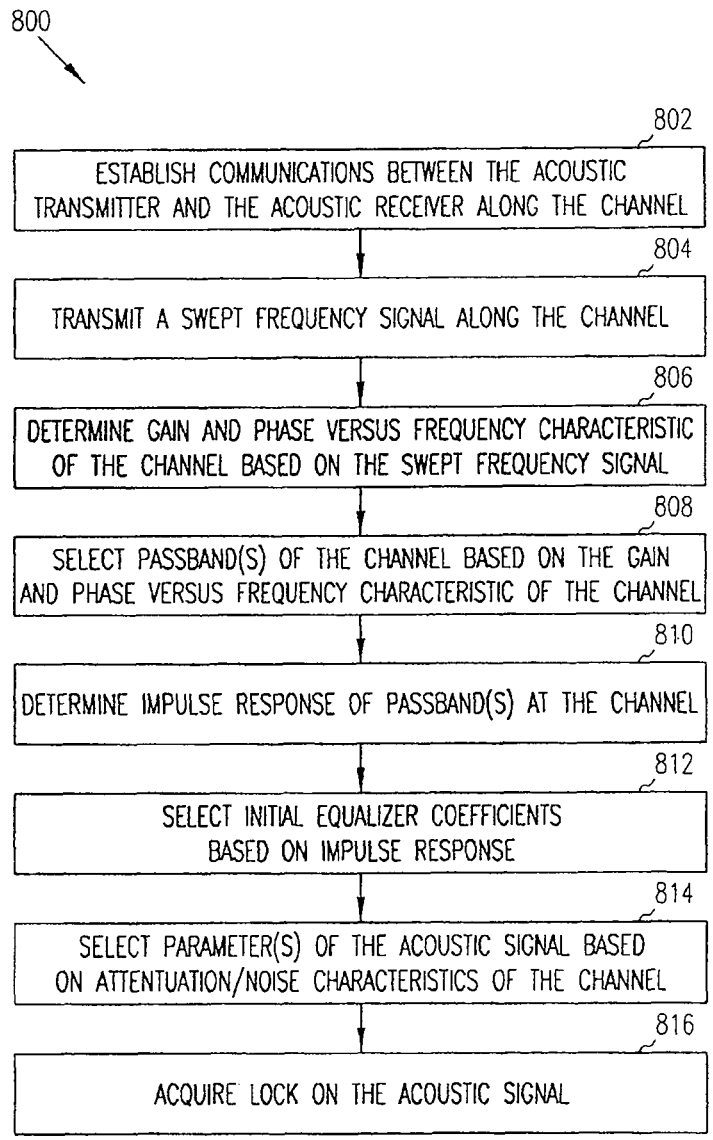
FIG. 8 illustrates a flow diagram of an initialization for acoustical communication that uses passband equalization, according to some embodiments of the invention.

FIG. 8 illustrates a flow diagram of an initialization for acoustic communication that uses passband equalization, according to some embodiments of the invention. A flow diagram 800 includes an embodiment of operations for determining parameters for equalization of the different passbands as well as the establishing of communications between the acoustic transmitter 302 and the acoustic receiver 306. In some embodiments, the operations of the flow diagram 800 are executed during a period when no drilling operations or operations related thereto are being performed.

In block 802, communications are established between the acoustic transmitter and the acoustic receiver along the channel. With reference to the embodiment of FIG. 3, the acoustic transmitter 302 and the acoustic receiver 306 may perform a bi-directional communication through the channel 304. Control continues at block 804.

In block 804, a swept frequency signal is transmitted along the channel. With reference to the embodiment of FIG. 3, the acoustic transmitter 302 transmits a swept frequency signal along the channel 304 that is received by the acoustic receiver 306. Control continues at block 806.

In block 806, a gain and phase v. frequency characteristic of the channel is determined based on the swept frequency signal. With reference to the embodiment of FIG. 3, the acoustic receiver 306 may make this determination. In some embodiments, the acoustic receiver 306 may make this determination by performing a Fourier Transform (such as a Fast Fourier Transform) on the received swept frequency signal.

The operations in blocks 804-806 allow for a determination of the characteristics of the channel 304. Alternatively or in addition to such operations, a downhole sensor system may be used to determine the characteristics of the channel 304. The downhole sensor system may include some type of transmitter load (current) or downhole accelerometer. Control continues at block 808.

In block 808, passband(s) of the channel are selected based on the gain and phase v. frequency characteristic of the channel. With reference to the embodiment of FIG. 3, the acoustic receiver 306 may make this selection. In particular, the acoustic receiver 308 may select one or more operational frequency bands (those bands of frequencies that are not reflected and/or cancelled because of the characteristics of the channel 304). In some embodiments, the bands may also be selected to reduce intermodulation distortion. For example, third order distortion effect results from the interaction between multiple simultaneous frequencies. Accordingly, the tones or bands may be positioned so that the distortion components are in the stop bands, thereby reducing the effect of the distortions. Control continues at block 810.

In block 810, an impulse response of the passbands of the channel is determined. With reference to the embodiment of FIG. 3, the acoustic receiver 306 may make this determination. The acoustic receiver 306 may determine the impulse response of the passbands of the channel 306 using any of a number of suitable operations. Examples of such operations are described in detail in Openheim & Schafer, *Discrete-Time Signal Processing*, Prentice Hall, 1989, which is hereby incorporated by reference. Alternatively or in addition, some embodiments may include a downhole sensor system (having a downhole accelerometer) to detect the impulse response of the passbands of the channel. Control continues at block 812.

In block 812, initial equalizer coefficients are selected for each of the passband(s) based on the impulse response. With reference to the embodiment of FIG. 3, the acoustic receiver 306 may select the initial equalizer coefficients. The acoustic receiver 306 may select the initial equalizer coefficients using any of a number of suitable operations. Examples of such operations are described in detail in Lee & Messerschmitt, *Digital Communications*, Kluwer, 1994, which is hereby incorporated by reference. In some embodiments, the acoustic receiver 306 may select the initial equalizer coefficients for a given passband, independently of the selection of the initial equalizer coefficients for the other passbands. Control continues at block 814.

In block 814, parameter(s) of the acoustic signal are selected based on attenuation and noise characteristics of the channel. With reference to the embodiment of FIG. 3, the acoustic receiver 306 may select these parameter(s). Such parameter(s) may include which passband(s) are to be used for data transmission, which modulation(s) are to be used for the passband(s), the data rate of the data transmission, etc. The acoustic receiver 306 may transmit such parameter(s) downhole to the acoustic transmitter 302. Control continues at block 816.

In block 816, a lock is acquired on the acoustic signal. With reference to the embodiment of FIG. 3, the acoustic transmitter 302 may start transmitting a known sequence of data until the acoustic receiver 306 locks to the acoustic signal. In some embodiments, the acoustic transmitter 302 may use a passband to transmit a pilot tone that may serve as a phase locking reference.

Figure 9:
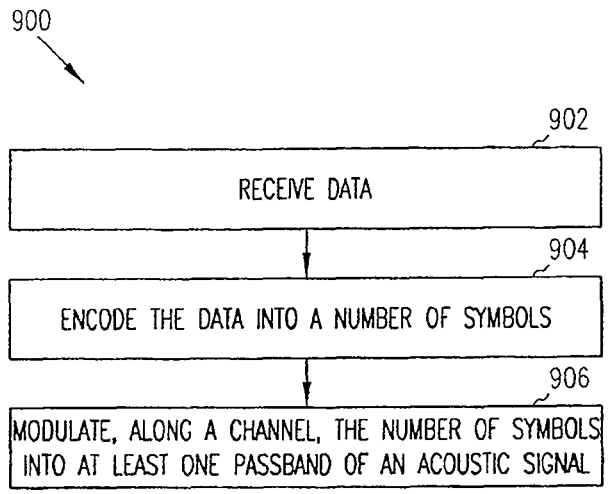
FIG. 9 illustrates a flow diagram for transmitting acoustic signals using passbands in the transmission channel, according to some embodiments of the invention.

FIG. 9 illustrates a flow diagram for transmitting acoustic signals using passbands in the transmission channel, according to some embodiments of the invention. In particular, FIG. 9 includes a flow diagram 900 that illustrates an embodiment of the operations of the acoustic transmitter 302 (shown in FIG. 5).

In block 902, data is received. With reference to the embodiments of FIGS. 1 and 5, the passband encoder 502 may receive data in the form of electrical signals from circuitry in the downhole tool 124. For example, the data may be different downhole measurements determined by the sensors 151. Control continues at block 904.

In block 904, the data is encoded into a number of symbols. With reference to the embodiment of FIG. 5, the passband encoder 502 encodes this data into a number of symbols. For example, the passband encoder 502 may encode this data into multipulse blocks. In some embodiments, the passband encoder 502 may include error correction redundancy and may preclude a predefined period of all-zero symbols from being modulated across the channel 304. Control continues at block 906.

In block 906, the number of symbols is modulated along a channel within at least one passband of an acoustic signal. With reference to the embodiment of FIG. 5, the modulator 504 performs this modulation. In some embodiments, the acoustic signal modulated along the channel 304 includes one to a number of passbands that are caused by various characteristics of the channel 304 (including the number of, size of and distance between joints along the channel 304). Accordingly, the modulator 504 may modulate the symbols in one or more of such passbands. As described above, the modulator 504 may modulate the encoded telemetry data using a number of different types of modulations in different combinations.

Figure 10:
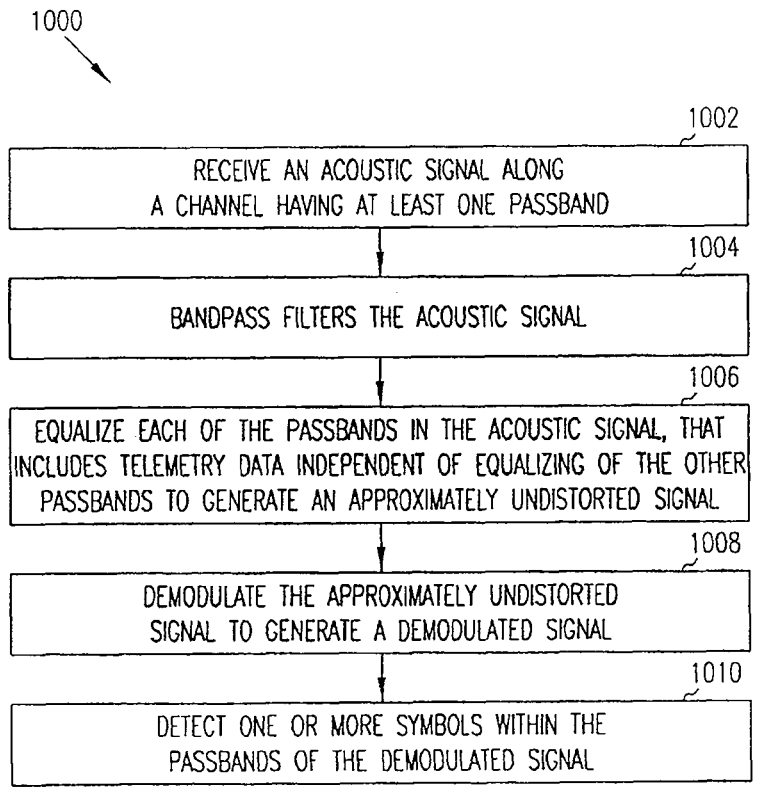
FIG. 10 illustrates a flow diagram for receiving acoustic signals using passband equalization, according to some embodiments of the invention.

FIG. 10 illustrates a flow diagram for receiving acoustic signals using passband equalization, according to some embodiments of the invention. In particular, FIG. 10 includes a flow diagram 1000 that illustrates an embodiment of the operations of the acoustic receiver 306 (shown in FIG. 7).

In block 1002, an acoustic signal along a channel having at least one passband is received. With reference to the embodiment of FIG. 7, the bandpass filter 702 receives this acoustic signal. Control continues at block 1004.

In block 1004, the acoustic signal is bandpass filtered. With reference to the embodiment of FIG. 7, the bandpass filter 702 performs this filter operation. The bandpass filter 702 may filter out frequencies that are not within the at least one passband that includes telemetry data. Control continues at block 1006.

In block 1006, each of the passbands in the acoustic signal (that includes telemetry data) is equalized, independent of equalization of the other passbands to generate an approximately undistorted signal. With reference to the embodiment of FIG. 7, the passband equalizer 704 performs this equalization of the different passbands. Control continues at block 1008.

In block 1008, the approximately undistorted signal is demodulated to generate a demodulated signal. With reference to the embodiment of FIG. 7, the demodulator 704 performs this demodulation. Control continues at block 1010.

In block 1010, one or more symbols within the passbands of the demodulated signal are detected. With reference to the embodiment of FIG. 7, the data detector 708 performs this detection. As described above, the data detector 708 may perform a decode operation, which may be the reverse of the encode operation performed by the passband encoder 502.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for an acoustic telemetry system using passband equalization, in accordance with some embodiments of the invention. A number of figures show flow diagrams illustrating operations for an acoustic telemetry system using passband equalization, in accordance with some embodiments of the invention. The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method comprising:
   transmitting a data communication by an acoustic signal that is modulated within multiple non-overlapping passbands in a jointed tubing string, wherein the modulated acoustic signal is separately modulated in each of the multiple passbands;
   before transmitting the acoustic signal, selecting the multiple passbands to place each passband substantially within a respective range of frequencies that is passed by the jointed tubing string, and to place intermodulation distortion components in stop bands substantially within respective a ranges of frequencies that are blocked by the jointed tubing string;

receiving the modulated acoustic signal from the multiple passbands at a location proximate the earth's surface;

performing amplitude and phase equalization for each passband of the received modulated acoustic signal to generate an equalized signal for each passband, the equalized signals for different passbands being generated based on different respective parameters for equalization; and demodulating the modulated acoustic signal after performing the equalization for each passband.

2. The method of claim 1, wherein the multiple passbands constitute segregated transmission channels.

3. The method of claim 2, further comprising modulating the acoustic signal in at least two of the multiple passbands using different modulation schemes.

4. The method of claim 1, further comprising:
receiving a swept frequency signal;
performing a Fourier transform of the swept frequency signal; and
selecting the multiple passbands based on gain and phase versus frequency characteristics associated with the Fourier transform.

5. The method of claim 4, further comprising determining equalization coefficients for each of the multiple passbands from the gain and phase versus frequency characteristics.

6. The method of claim 5, further comprising:
determining an impulse response of the jointed tubing string in the passbands; and
determining initial equalization coefficients for each of the multiple passbands through use of the determined impulse response.

7. A method comprising:
transmitting an acoustic signal through jointed tubing wherein the acoustic signal is separately modulated within a plurality of passbands, to generate a modulated acoustic signal;
receiving the modulated acoustic signal after transmission through the jointed tubing;
performing amplitude and phase equalization on the received acoustic signal for each of the passbands based on respective passband-specific parameters for equalization;
determining an impulse response of the jointed tubing in the passbands; and
determining initial equalization coefficients for each of the passbands using the determined impulse response.

8. The method of claim 7, wherein the passbands are non-overlapping.

9. The method of claim 7, further comprising demodulating the received signal to generate a demodulated signal.

10. The method of claim 9, further comprising detecting one or more symbols within one or more of the passbands of the demodulated signal.

11. The method of claim 7 further comprising modulating the acoustic signal in at least two of the passbands using different modulation schemes.

12. The method of claim 7, further comprising detecting the impulse response of the jointed tubing in the passbands using a downhole accelerometer.

13. A method, comprising the acts of:
transmitting a swept frequency signal from a downhole location and across a channel comprising jointed tubing;
receiving the swept frequency signal proximate a surface location;
evaluating signal carrying properties of the channel with reference to the received swept frequency signal to identify a plurality of non-overlapping frequency ranges in which the swept frequency signal is passed along the channel and a plurality of non-overlapping stop bands in which the swept frequency signal is blocked along the channel;
selecting multiple passbands to be used for data communication across the channel to fall within respective ones of the plurality of passed frequency ranges and to place intermodulation distortion components in the plurality of stop bands;
selecting a modulation from a plurality of different modulations for each selected passband in reference to the evaluated signal carrying properties, so that at least two of the multiple selected passbands have different selected modulations; and
transmitting an acoustic data signal across the channel through the selected passbands, the transmitting performed in accordance with the selected modulation separately for each passband.

14. The method of claim 13, further comprising the acts of:
determining an impulse response of the passbands; and
determining initial equalization coefficients for each passband of said passbands through use of the determined impulse response.

15. The method of claim 13, further comprising selecting the data rate of the transmission for each of the passbands.

16. The method of claim 13, wherein the modulation for each of the passbands is selected from a group that includes quadrature amplitude modulation (QAM), frequency shift keying (FSK), phase shift keying (PSK), and multi-pulse correlation modulation.

17. The method of claim 16, wherein initial equalization coefficients are determined independently for each of the passbands.

18. The method of claim 13 wherein gain characteristics and phase versus frequency characteristics of the channel are determined through use of the received swept frequency signal, and wherein the passbands are determined through use of the determined gain characteristics and phase versus frequency characteristics.

* * * * *